United States Patent
Yamasaki et al.

(10) Patent No.: US 11,772,194 B2
(45) Date of Patent: Oct. 3, 2023

(54) METHOD FOR DESIGNING LAMINATE MOLDED ARTICLE, PRODUCTION METHOD, PRODUCTION DEVICE, AND PROGRAM

(71) Applicant: KOBE STEEL, LTD., Hyogo (JP)

(72) Inventors: Takemasa Yamasaki, Hyogo (JP); Tatsuya Fujii, Hyogo (JP); Shinji Sato, Hyogo (JP); Takeshi Yamada, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 11 days.

(21) Appl. No.: 16/764,328

(22) PCT Filed: Nov. 29, 2018

(86) PCT No.: PCT/JP2018/044037
§ 371 (c)(1),
(2) Date: May 14, 2020

(87) PCT Pub. No.: WO2019/107506
PCT Pub. Date: Jun. 6, 2019

(65) Prior Publication Data
US 2020/0282497 A1    Sep. 10, 2020

(30) Foreign Application Priority Data
Nov. 29, 2017    (JP) .................. 2017-229606

(51) Int. Cl.
*B23K 26/342*    (2014.01)
*B23K 9/032*    (2006.01)
(Continued)

(52) U.S. Cl.
CPC .......... *B23K 26/342* (2015.10); *B23K 9/0325* (2013.01); *B23K 9/044* (2013.01);
(Continued)

(58) Field of Classification Search
CPC .... B23K 26/342; B23K 9/0325; B23K 9/044; B23K 9/095; B23K 9/127; B33Y 10/00
See application file for complete search history.

(56) References Cited

U.S. PATENT DOCUMENTS 4,689,463 A    8/1987 Shubert
4,745,256 A    5/1988 Shubert
(Continued)

FOREIGN PATENT DOCUMENTS

CN    86101470 A    8/1986
CN    106513931 A    3/2017
(Continued)

OTHER PUBLICATIONS

The extended European search report issued by the European Patent Office dated Aug. 4, 2021, which corresponds to European Patent Application No. 18884465.8-1016 and is related to U.S. Appl. No. 16/764,328.

*Primary Examiner* — Nathaniel E Wiehe
*Assistant Examiner* — Dilnessa B Belay
(74) *Attorney, Agent, or Firm* — Studebaker & Brackett PC

(57) ABSTRACT

A method for designing an additively-manufactured object includes: a slicing step of slicing a shape of the additively-manufactured object into weld bead layers each having a height corresponding to one bead layer using data of the shape of the additively-manufactured object, thereby generating a plurality of virtual bead layers; a reference direction setting step of setting, as a reference direction, a direction in which the sliced layer of the additively-manufactured object is continuously provided and extended in an intermediate layer disposed at a deposition-direction center of the plurality of virtual bead layers; and a bead adjusting step of adjusting a bead size of the weld bead to be formed (Continued)

in the plurality of virtual bead layers depending on a bead shape in a section perpendicular to the reference direction.

13 Claims, 14 Drawing Sheets

(51) Int. Cl.
  *B23K 9/04* (2006.01)
  *B23K 9/095* (2006.01)
  *B23K 9/127* (2006.01)
  *B33Y 10/00* (2015.01)
  *B33Y 30/00* (2015.01)
  *B33Y 50/00* (2015.01)

(52) U.S. Cl.
  CPC .............. *B23K 9/095* (2013.01); *B23K 9/127* (2013.01); *B33Y 10/00* (2014.12); *B33Y 30/00* (2014.12); *B33Y 50/00* (2014.12)

(56) References Cited

U.S. PATENT DOCUMENTS

| | | | |
|---|---|---|---|
| 2003/0010764 A1* | 1/2003 | Handa | B23K 31/125 219/137 R |
| 2013/0197683 A1* | 8/2013 | Zhang | B22F 10/66 700/96 |
| 2016/0263832 A1* | 9/2016 | Bui | B29C 64/141 |
| 2017/0232518 A1* | 8/2017 | Shi | B23K 26/342 419/7 |

FOREIGN PATENT DOCUMENTS

| | | | |
|---|---|---|---|
| CN | 107150208 A | * | 9/2017 |
| CN | 107150208 A | | 9/2017 |
| WO | 2016149774 A1 | | 9/2016 |

* cited by examiner

METHOD FOR DESIGNING LAMINATE MOLDED ARTICLE, PRODUCTION METHOD, PRODUCTION DEVICE, AND PROGRAM

TECHNICAL FIELD

The present invention relates to a method for designing an additively-manufactured object, a method for manufacturing the same, an apparatus for manufacturing the same, and a program.

BACKGROUND ART

In recent years, there is a growing need for building using a 3D printer as a production means. Researches and developments have been made toward practical applications of building using a metal material. A 3D printer for building using a metal material produces an additively-manufactured object by melting a metal powder or a metal wire by use of a heat source such as a laser or an electron beam or another heat source such as an arc, and depositing the molten metal.

For example, in the case of using an arc, a filler metal is melted and solidified by the arc to form a weld bead, and the weld bead is deposited into a plurality of layers to produce an additively-manufactured object. As for a technique for forming such a weld bead, Patent Literature 1 describes a technique in which an impeller rotatable attached to a housing and having a plurality of blades is formed by laser cladding.

CITATION LIST

Patent Literature

Patent Literature 1: WO 2016/149774

SUMMARY OF INVENTION

Technical Problem

In the method for manufacturing an impeller according to Patent Literature 1, each blade is formed by depositing a plurality of metal layers along the shape of the blade. However, Patent Literature 1 has no disclosure about a procedure for depositing and building a work having a desired shape but describes only a process of manufacturing an impeller having a specific shape.

When an additively-manufactured object is deposited and built by a weld bead, a length with which the weld bead can be continuously formed may vary depending on a direction in which the bead is formed. In the case where the continuously formed length is short, operations having no contribution to the formation of a weld bead, such as frequently turning on/off heating of the filler material and moving a torch serving as a heat source to a next bead formation position. As a result, takt time for laminating and building increases, which lowers the building efficiency.

In order to build an additively-manufactured object with a high efficiency, it is necessary to select an optimal direction to form a bead such that the bead can be formed as continuously as possible. However, how to select the direction to form the bead depends on the experience and intuition of a worker. Such work requires a great deal of skill.

On the other hand, there has been known a metal shaping technique using a powder head system for melting a powder to produce a built-up object. In this shaping method, it is not necessary to select a bead formation direction as described above, but a thermal head must scan a horizontal section two-dimensionally uniformly. Therefore, for example, the scanning time becomes long for some shapes of the built-up object. Thus, the method cannot be always regarded as an efficient shaping method.

The present invention has been developed in consideration of the aforementioned situation. An object of the invention is to provide a versatile designing method, a manufacturing method and a manufacturing apparatus for additively-manufactured object, capable of building an additively-manufactured object with a high efficiency and in a reduced takt time when the additively-manufactured object having a shape extending in a specific direction is built by depositing a weld bead in a plurality of layers, and a program for making a computer execute a procedure for designing the additively-manufactured object.

Solution to Problem

The present invention includes the following configurations.

(1) A method for designing an additively-manufactured object to be built by depositing a plurality of weld bead layers formed of a weld bead formed by melting and solidifying a filler metal, the method including:
a slicing step of slicing a shape of the additively-manufactured object into weld bead layers each having a height corresponding to one bead layer using data of the shape of the additively-manufactured object, thereby generating a plurality of virtual bead layers;
a reference direction setting step of setting, as a reference direction, a direction in which the sliced layer of the additively-manufactured object is continuously provided and extended in an intermediate layer disposed at a deposition-direction center of the plurality of virtual bead layers; and
a bead adjusting step of adjusting a bead size of the weld bead to be formed in the plurality of virtual bead layers depending on a bead shape in a section perpendicular to the reference direction.

(2) A method for manufacturing an additively-manufactured object built by depositing a plurality of weld bead layers formed of a weld bead formed by melting and solidifying a filler metal, the method including:
a slicing step of slicing a shape of the additively-manufactured object into weld bead layers each having a height corresponding to one bead layer using data of the shape of the additively-manufactured object, thereby generating a plurality of virtual bead layers;
a reference direction setting step of setting, as a reference direction, a direction in which the sliced layer of the additively-manufactured object is continuously provided and extended in an intermediate layer disposed at a deposition-direction center of the plurality of virtual bead layers; and
a bead adjusting step of adjusting a bead size of the weld bead to be formed in the plurality of virtual bead layers depending on a bead shape in a section perpendicular to the reference direction; and
a building step of forming and depositing the plurality of virtual bead layers sequentially in accordance with the bead size adjusted in the bead adjusting step, thereby building the additively-manufactured object.

(3) A program for making a computer execute a procedure for designing an additively-manufactured object to be built by depositing a plurality of weld bead layers formed of a weld bead formed by melting and solidifying a filler metal, the program making the computer implement:

a slicing function of slicing a shape of the additively-manufactured object into weld bead layers each having a height corresponding to one bead layer using data of the shape of the additively-manufactured object, thereby generating a plurality of virtual bead layers;

a reference direction setting function of setting, as a reference direction, a direction in which the sliced layer of the additively-manufactured object is continuously provided and extended in an intermediate layer disposed at a deposition-direction center of the plurality of virtual bead layers; and a bead adjusting function of adjusting a bead size of the weld bead to be formed in the plurality of virtual bead layers depending on a bead shape in a section perpendicular to the reference direction.

(4) An apparatus for manufacturing an additively-manufactured object to be built by depositing a plurality of weld bead layers formed of a weld bead formed by melting and solidifying a filler metal, the apparatus including a control unit and a building unit, in which the control unit is configured to:

slice a shape of the additively-manufactured object into weld bead layers each having a height corresponding to one bead layer using data of the shape of the additively-manufactured object, thereby generating a plurality of virtual bead layers;

set, as a reference direction, a direction in which the sliced layer of the additively-manufactured object is continuously provided and extended in an intermediate layer disposed at a deposition-direction center of the plurality of virtual bead layers; and adjust a bead size of the weld bead to be formed in the plurality of virtual bead layers depending on a bead shape in a section perpendicular to the reference direction, in which the building unit is configured to be driven by the control unit to form the plurality of virtual bead layers sequentially in accordance with the adjusted bead size.

Advantageous Effects of Invention

In the present invention, it is possible to build an additively-manufactured object with a high efficiency and in a reduced takt time when the additively-manufactured object having a shape extending in a specific direction is built by depositing weld beads in a plurality of layers.

DESCRIPTION OF EMBODIMENTS

Figure 1:
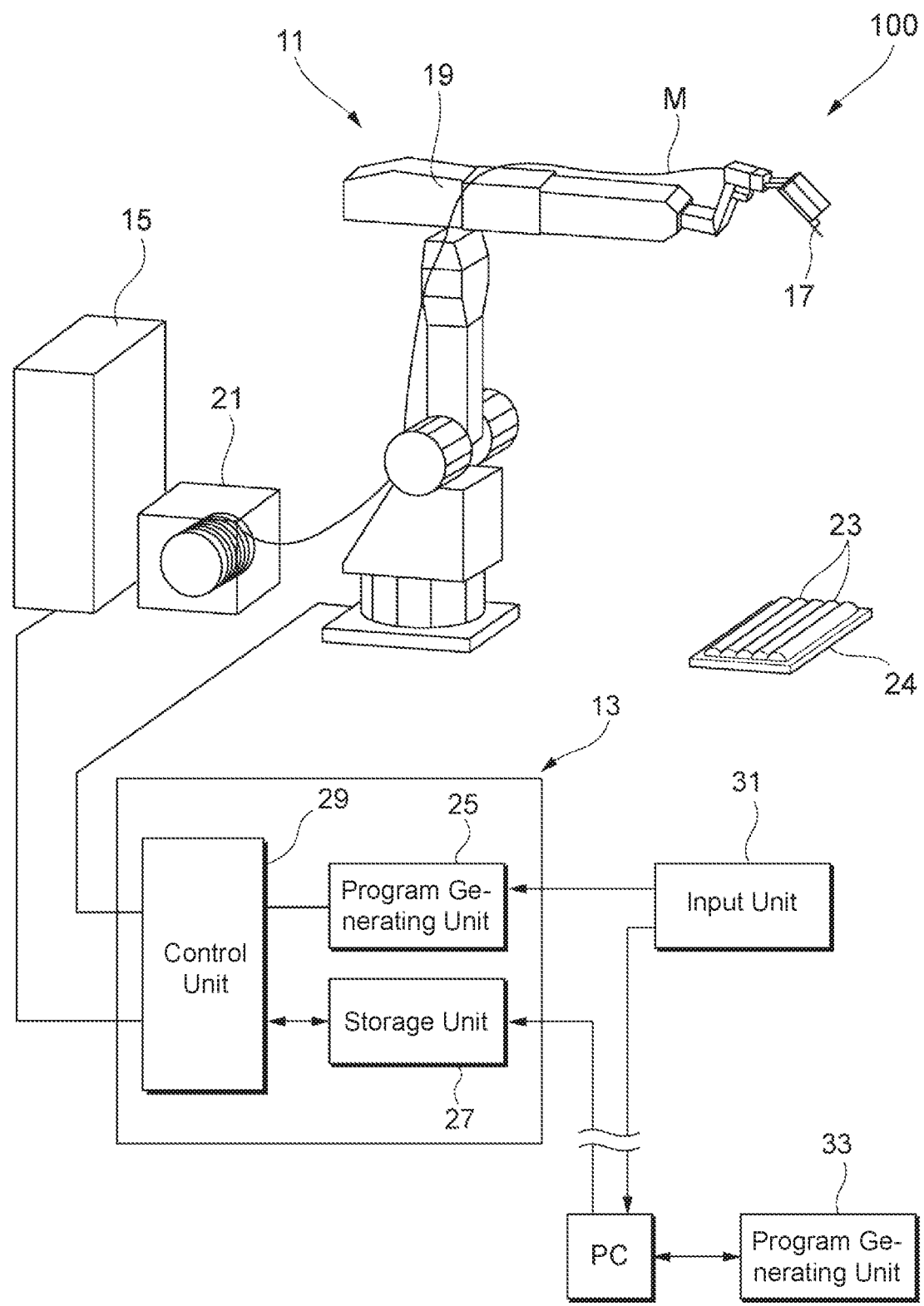
FIG. 1 is a schematic configuration view of a manufacturing apparatus for manufacturing an additively-manufactured object in the present invention.

Embodiments of the present invention will be described in detail below by referring to the drawings.

FIG. 1 is a schematic configuration view of a manufacturing apparatus for manufacturing an additively-manufactured object in the present invention.

A manufacturing apparatus 100 for the laminate-built objet having the configuration includes a building unit 11, a building controller 13 for collectively controlling the building unit 11, and a power supply unit 15.

The building unit 11 includes a welding robot 19 having a torch 17 provided on the tip shaft and serving as a torch moving mechanism, and a filler metal feeding unit 21 for feeding a filler metal (weld wire) M to the torch 17.

The welding robot 19 is an articulated robot which has, for example, degrees of freedom on 6 axes, and in the torch 17 attached to the tip shaft of a robot arm, the filler metal M is supported such that it can be continuously fed. The position or posture of the torch 17 can be set three-dimensionally desirably within the range of the degree of freedom of the robot arm.

The torch 17 includes a not-shown shield nozzle, and a shielding gas is supplied from the shield nozzle. The arc welding method may be either a consumable electrode type such as shielded metal arc welding or carbon dioxide gas arc welding, or a non-consumable electrode type such as TIG welding or plasma arc welding. The arc welding method is appropriately selected depending on the additively-manufactured object to be manufactured. For example, in the case of the consumable electrode type, a contact tip is disposed inside the shield nozzle, and the filler metal M to which a melting current is to be supplied is held on the contact tip.

The torch 17 generates an arc from the tip of the filler metal M in a shielding gas atmosphere while holding the filler metal M. The filler metal M is fed from the filler metal feeding unit 21 to the torch 17 by a not-shown delivery mechanism attached to the robot arm, etc. Then, the filler metal M fed continuously is melted and solidified while the torch 17 is moved by the welding robot 19. Thus, linear weld beads 23 which are melt-solidified bodies of the filler metal M are formed on a base material 24 as described in detail later.

The heat source for melting the filler metal M is not limited to the aforementioned arc. A heat source using another system such as a heating system using an arc and a laser together, a heating system using a plasma or a heating system using an electron beam or a laser may be used. In the case of heating by an electron beam or a laser, a heating amount can be controlled more finely to keep each weld bead in a more proper state, thereby contributing to further improvement of the quality of the additively-manufactured object.

The building controller 13 includes a program generating unit 25, a storage unit 27, and a control unit 29 to which the program generating unit 25 and the storage unit 27 are connected.

The program generating unit 25 sets a procedure for driving the building unit 11 to build the additively-manufactured object, based on shape data (such as CAD data) of the additively-manufactured object to be manufactured. The shape data is input from an input unit 31. The program generating unit 25 generates a program for making a computer execute the procedure set thus. The generated program is stored in the storage unit 27. In addition, various kinds of specification information such as various drivers or movable ranges for the building unit 11 are stored in the storage unit 27. The specification information is referred to appropriately when a program is generated by the program generating unit 25 or when the program is executed. The storage unit 27 includes a storage medium such as a memory or a hard disk, to and from which various kinds of information can be input and output.

The control unit 29 is a computer unit having a CPU, a memory, an I/O interface and so on. The control unit 29 has a function of reading a program stored in the storage unit 27 and executing the program, and a function of driving and controlling each portion of the building unit 11. The control unit 29 executes driving control or a program in accordance with an instruction issued by operation on the input unit 31, communication, and so on. The program will be described in detail later.

The program generating unit 25 does not have to be provided on the building controller 13 side, but may be, for example, provided separately from the apparatus 100 for manufacturing the additively-manufactured object and in the computer PC such as a server or a terminal disposed separately through a communication system such as a network or through a storage medium. In the case where a program generating unit 33 is connected to the computer PC, a program can be generated without requiring the apparatus 100 for manufacturing the additively-manufactured object such that the work of generating the program does not become complicated. In addition, by transmitting the generated program to the storage unit 27 of the building controller 13, the program can be executed in the same manner as a program generated in the building controller 13.

The control unit 29 executes a program stored in the storage unit 27 to drive the welding robot 19, the power supply unit 15, etc. in accordance with a predetermined procedure. That is, in response to an instruction from the building controller 13, the welding robot 19 moves the torch 17 along a track or a locus programmed in advance, and melts the filler metal M by an arc at a predetermined timing and forms weld beads 23. FIG. 1 shows a state in which the weld beads 23 are formed on a plate-shaped base material 24 to build an additively-manufactured object. The additively-manufactured object may have a desired shape.

The base material 24 is made of a metal plate such as a steel plate. Basically a metal plate larger than a bottom surface (surface of a lowermost layer) of the additively-manufactured object is used as the base material 24. In addition, the base material 24 is not limited to such a plate-shaped one, but may be a base having another shape such as a block or a rod shape.

Any commercially available weld wire can be used as the filler metal M. For example, wires provided as MAG welding and MIG welding solid wires (JIS Z 3312) for mild steel, high tensile steel and cryogenic steel, and arc welding flux cored wires (JIS Z 3313) for mild steel, high tensile steel and cryogenic steel can be used as the filler metal M.

First, the apparatus 100 configured thus for manufacturing the additively-manufactured object forms a plurality of linear weld beads 23 adjoining one another on the base material 24 and forms a weld bead layer.

Figure 2:
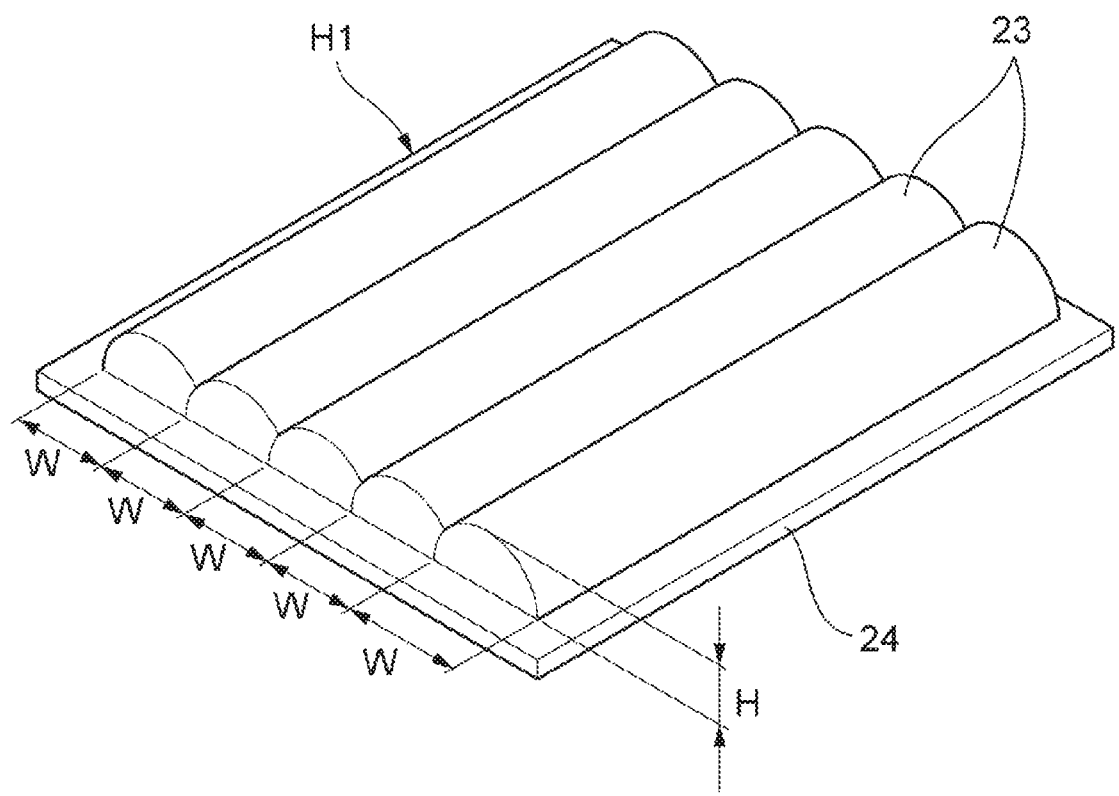
FIG. 2 is a schematic perspective view of weld beads formed on a base material.

FIG. 2 is a schematic perspective view of the weld beads 23 formed on the base material 24.

A weld bead layer H1 formed on the upper surface of the base material 24 is composed of a plurality of rows of the linear weld beads 23, which are formed such that each weld bead 23 has a predetermined bead width W and is adjacent to one another without any gap. By depositing a next weld bead layer on the weld bead layer H1 repeatedly, an additively-manufactured object having a desired shape is built up.

Next, a program generated by the program generating unit 25 will be described in detail.

Figure 3:
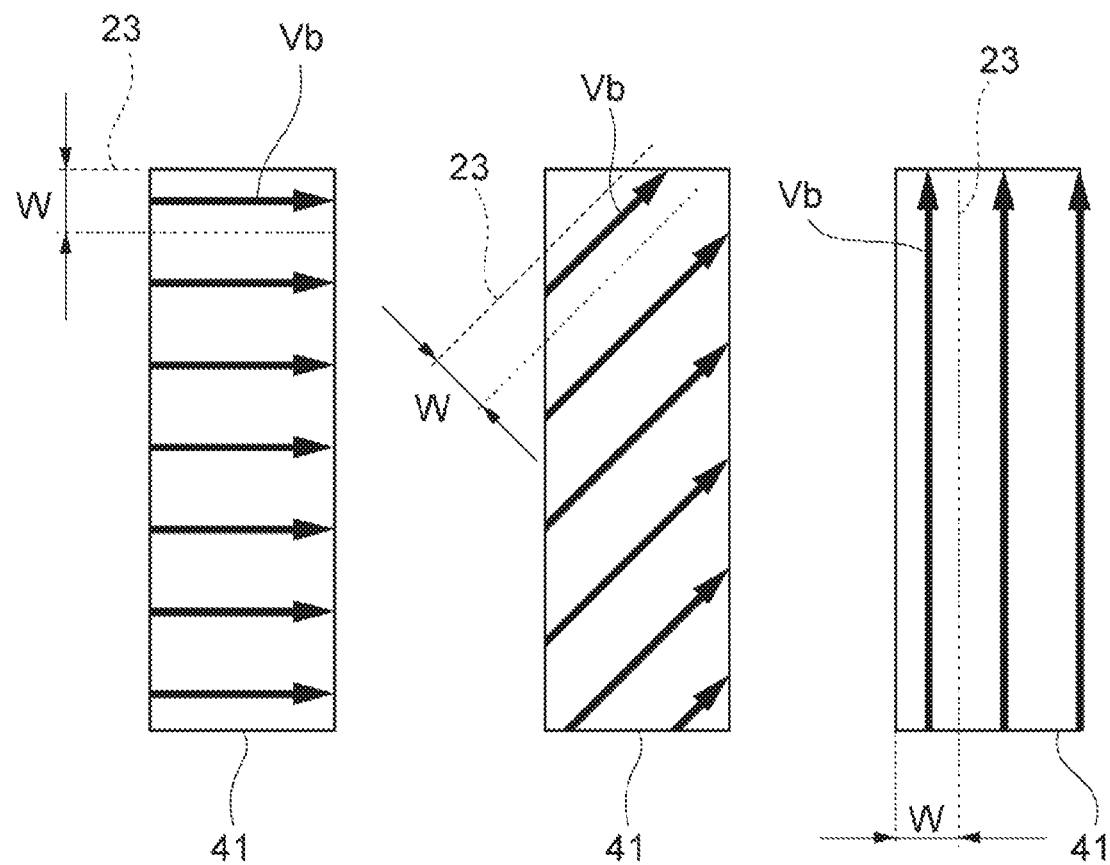
FIG. 3 is an explanatory view schematically showing an additively-manufactured object to be manufactured, and directions in which the weld beads are formed.

FIG. 3 is an explanatory view schematically showing a shape of an additively-manufactured object 41 to be manufactured, and directions in which weld beads are formed.

Here, it is assumed that the additively-manufactured object 41 has a rectangular shape as shown in (A) to (C) of FIG. 3, and the rectangular shape is covered with weld beads 23 each having a bead width W so as to form a single weld bead layer.

In the case where a continuous formation direction Vb in which each weld bead 23 is formed continuously is set at a direction along the short sides of the rectangular shape as shown in (A), it is necessary to form a large number of short weld beads 23 along the short sides. In the case where the continuous formation direction Vb is set at a direction inclined with respect to the short sides and the long sides of the rectangular shape as shown in (B), the continuous formation length of each weld bead 23 can be increased and the number of weld beads 23 in comparison with the case of (A) can be reduced. Further, in the case where the continuous formation direction Yb for each weld bead 23 is set at a direction along the long sides of the rectangular shape as shown in (C), the continuous formation length of each weld bead 23 is further increased and the number of weld beads 23 is smaller than in any other case.

As the length (continuous formation length) from a start point to an end point for continuously forming each weld bead 23 is longer, the takt time for forming the bead can be shortened to enhance the building efficiency. That is, when the torch reaches the end point in the formation of the weld bead 23, generation of the arc is stopped, and the robot arm moves the torch to a start point where a next weld bead will be formed. After the torch is moved to the start point, an arc is generated again, and the torch is moved toward a next end point. The lower the number of times of repeating the aforementioned step, the more preferable because the weld bead can be formed more continuously.

Therefore, in this configuration, a direction in which each weld bead 23 can be formed as continuously as possible is extracted depending on the shape of the additively-manufactured object 41, and the extracted direction is set as the continuous formation direction (reference direction) for the weld bead. In this manner, the continuous formation length of each weld bead 23 is increased to reduce the number of times of turning the arc on/off, such that the frequency of torch movement having no contribution to the formation of the weld bead 23 can be reduced. Thus, the building efficiency of the additively-manufactured object can be improved.

For example, in the case where the additively-manufactured object 41 has at least one protrusion portion which is continuous in a specific direction, when each weld bead is formed in the specific continuous direction, the additively-manufactured object can be built efficiently, which reduces the complication of the depositing-building step. Therefore, first, a specific direction in which the additively-manufactured object is continuous is obtained from shape data of the additively-manufactured object to be manufactured. The specific direction may be determined by arithmetic operation of a computer analyzing the shape data along an appropriate algorithm, or may be determined artificially, for example by a judge of a worker.

Then, the obtained specific direction is used as a reference direction to determine a layout of weld beads in a section perpendicular to the reference direction. A program for making a computer execute the aforementioned step of setting the reference direction from the shape data and determining the layout of the weld beads is generated by the aforementioned program generating unit 25 (see FIG. 1). The program mentioned here includes instruction codes for making the building unit 11 execute a procedure designed for formation of weld beads by predetermined arithmetic operation from input shape data. Accordingly, a program prepared in advance is specified by the control unit 29, and the control unit 29 executes the specified program. Thus, the building unit 11 manufactures the additively-manufactured object 41.

Next, along a specific example of the additively-manufactured object 41, a procedure for depositing the additively-manufactured object will be described in detail.

Figure 4:
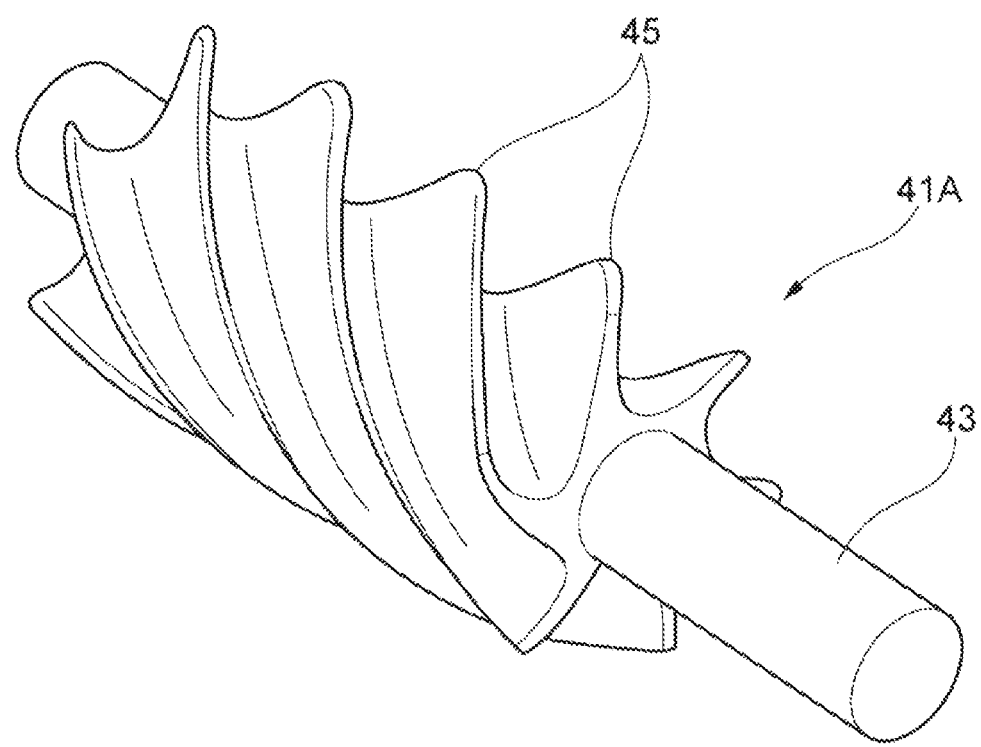
FIG. 4 is a perspective view showing an example of the additively-manufactured object.

FIG. 4 is a perspective view of the additively-manufactured object 41A illustrated as an example.

The additively-manufactured object 41A has a columnar shaft body 43, and a plurality (six in the illustrated example) of spiral blades 45 protruding radially outward in the outer circumference of the shaft body 43. The blades 45 have a screw shape in which the blades 45 are provided circumferentially at a same interval in an axially intermediate portion of the shaft body 43.

Figure 5:
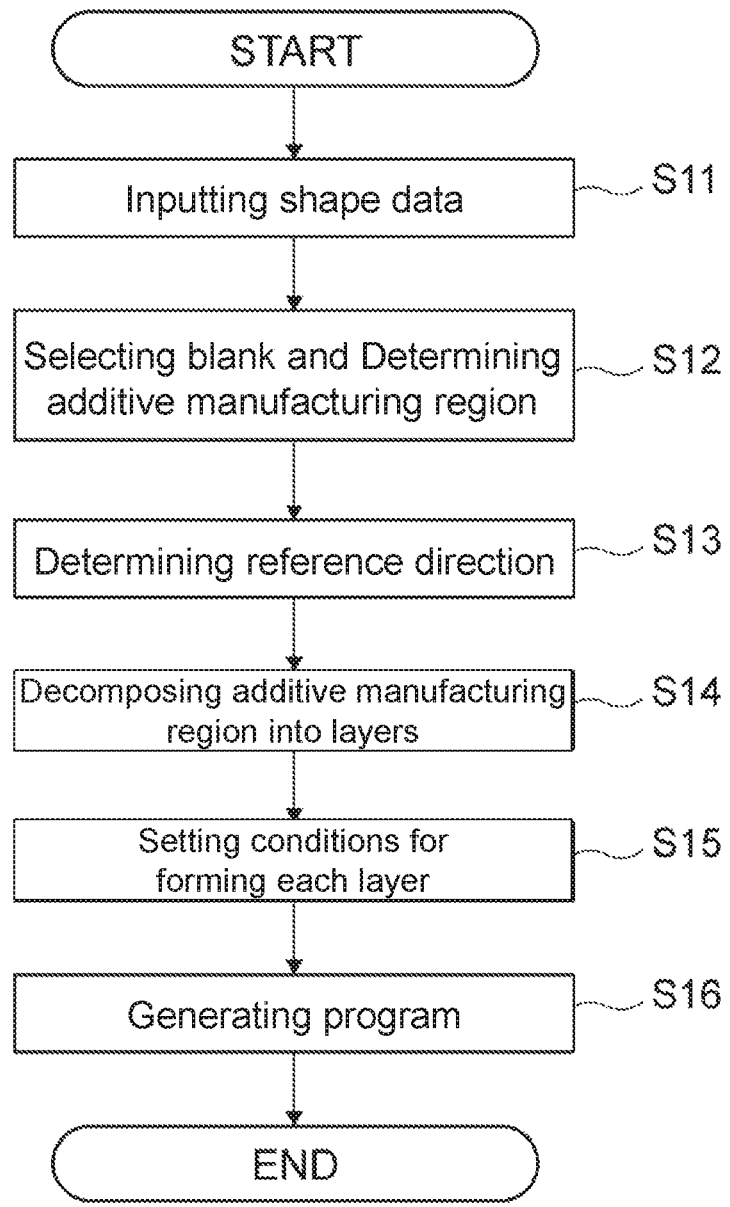
FIG. 5 is a flow chart showing a procedure of a program for designing, depositing and building an additively-manufactured object.

FIG. 5 is a flow chart showing the procedure of the program for designing, depositing and building the additively-manufactured object 41A. Based on the figure, steps until building up the additively-manufactured object 41A will be described in order.

First, shape data such as CAD data of the additively-manufactured object 41A is input to the program generating unit 25 shown in FIG. 1 (S11). The shape data includes information about coordinates of the outer surface of the additively-manufactured object 41A, dimensional information such as the diameter, shaft length, etc. of the shaft body 43, and if necessary, information about kinds of materials to be referred, final finishing, and so on. The following steps until a program is generated is performed by the program generating unit 25.

Figure 6:
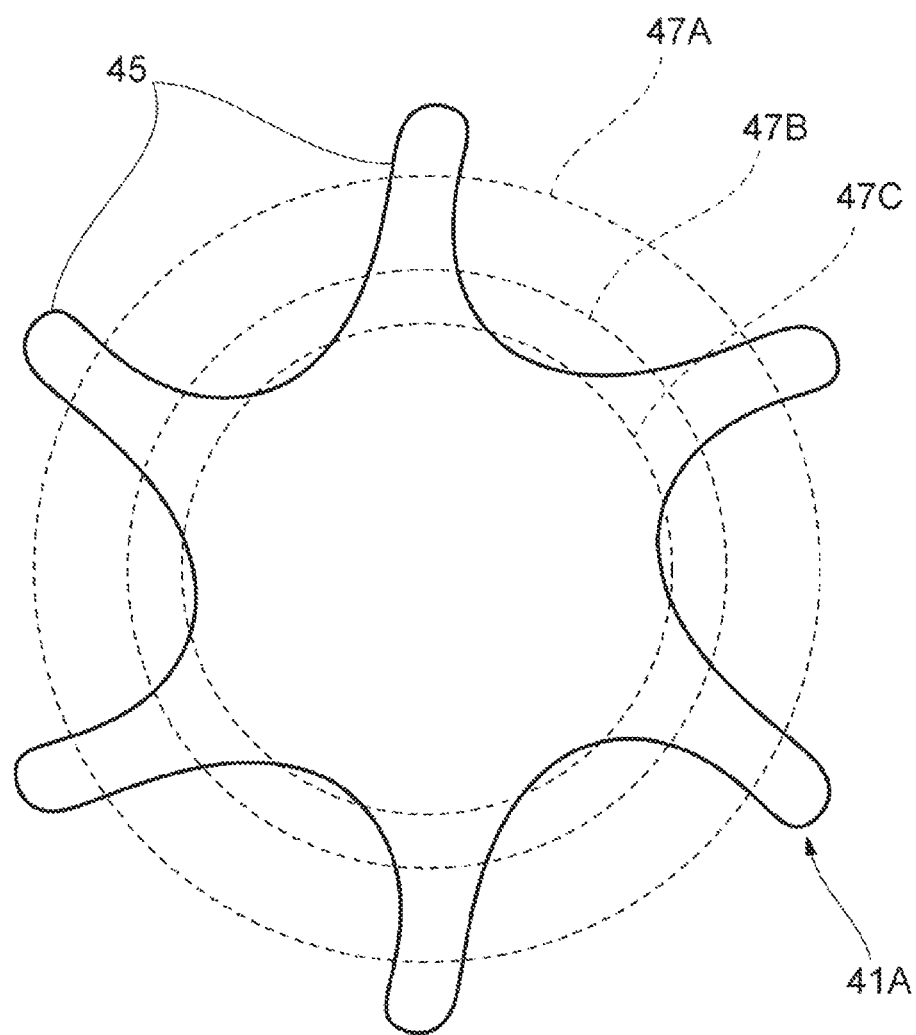
FIG. 6 is an explanatory view showing a state in which a blank region is determined in a sectional shape of an additively-manufactured object.

FIG. 6 is an explanatory view showing a state in which a blank region is determined in a sectional shape of an additively-manufactured object 41A.

The additively-manufactured object 41A has a cylindrical shaft body 43 and a plurality of blades 45 provided to stand from the shaft body 43 as shown in FIG. 4. Therefore, when the additively-manufactured object 41A is built, the whole shape thereof is not formed by an additive manufacturing method, but the shaft body 43 is formed using a blank such as a bar, and the blades 45 are formed by the additive manufacturing method. Thus, the man-hours in building the additively-manufactured object 41A can be largely reduced.

First, using input shape data, the outer shape of the additively-manufactured object 41A is divided into a blank region serving as a base body of the additively-manufactured object 41A, and an additive manufacturing region serving as the outer shape of the additively-manufactured object 41 to be formed on the base body.

The blank region and the additive manufacturing region are determined by the shape data and kinds of blanks which can be prepared.

In the case of the additively-manufactured object 41A shown in FIG. 6, among blanks (round bars) 47A, 47B and 47C illustrated by way of example, the blank 47C having a diameter which can minimize the cutting amount for following the shape of the additively-manufactured object 41A is selected.

Figure 7:
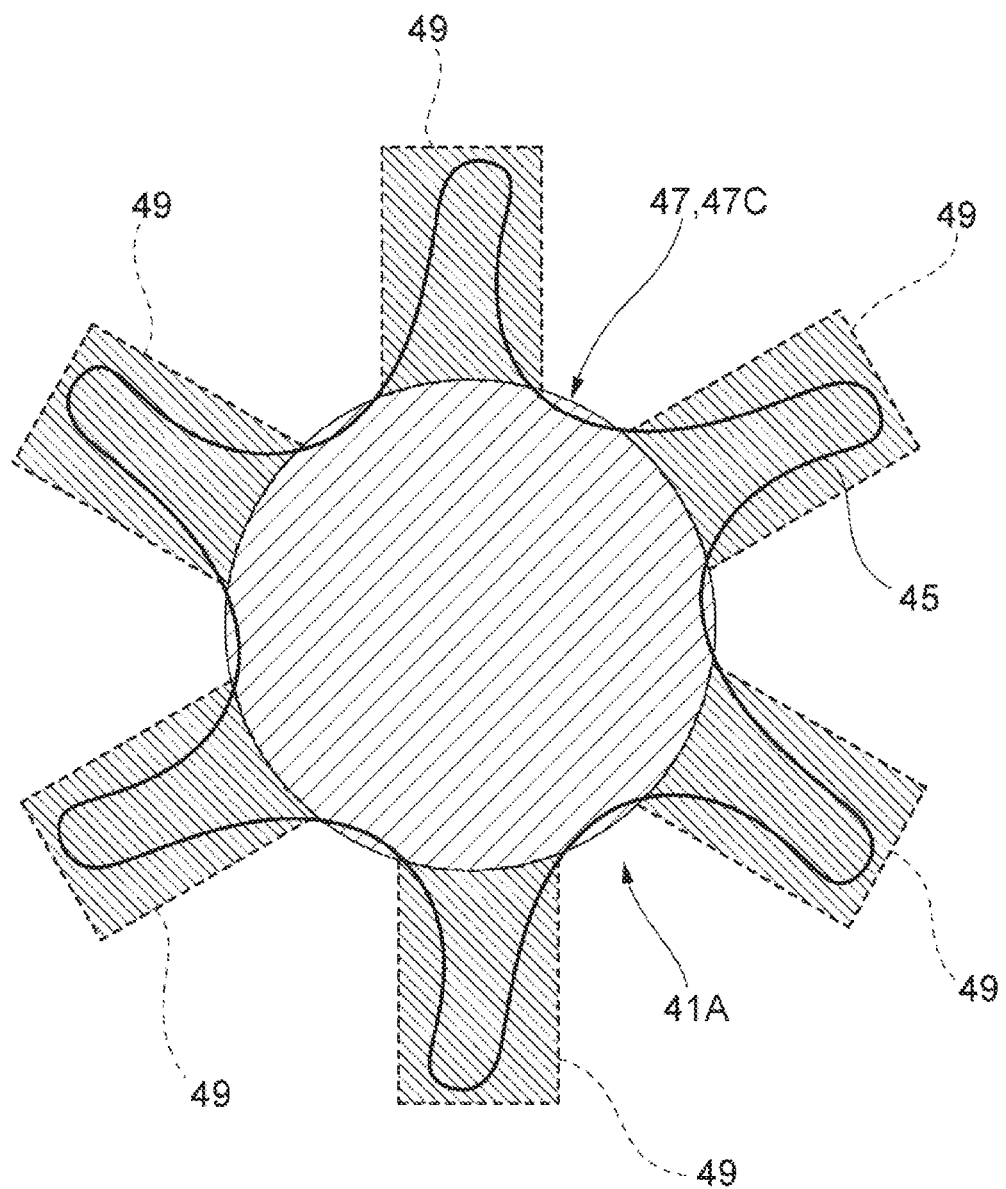
FIG. 7 is an explanatory view showing a result of dividing an outer shape of the additively-manufactured object into a blank region and an additive manufacturing region.

FIG. 7 is an explanatory view showing a result of dividing the outer shape of the additively-manufactured object 41A into a blank region 47 and an additive manufacturing region 49.

In this example, the blank 47C serves as the blank region 47, and each of the blades 45 in a region located radially outside the blank 47C serves as an additive manufacturing region 49 (S12).

Next, a procedure for forming weld beads in an additive manufacturing region 49 disposed in the outer circumference of the blank 47C determined in the aforementioned S12 will be considered.

The additive manufacturing region 49 is built by depositing a plurality of weld beads sequentially. Bead size including bead width, bead height, etc. in each of the weld beads constituting the additive manufacturing region 49 is controlled by changing welding conditions such as a moving speed of the torch 17 (see FIG. 1), that is, a continuous formation speed of the weld bead, a heat input to a filler metal or a welding portion, that is, a welding current, a welding voltage, an applied pulse, etc. from the power supply unit 15, and so on. The bead size is preferably managed on a section perpendicular to the moving direction of the torch for forming the weld beads.

Figure 8:
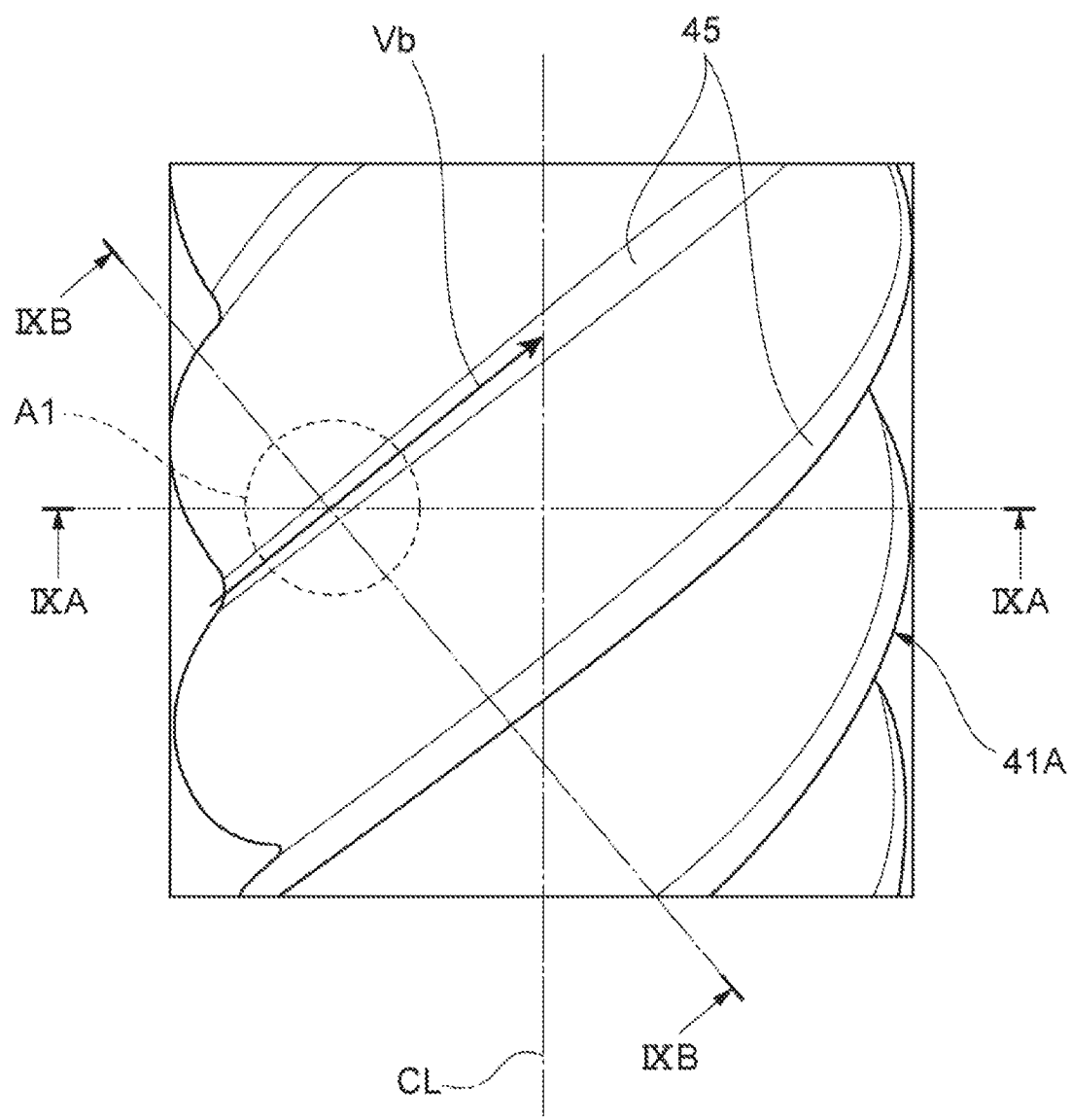
FIG. 8 is a front view of the additively-manufactured object.
Figure 9:
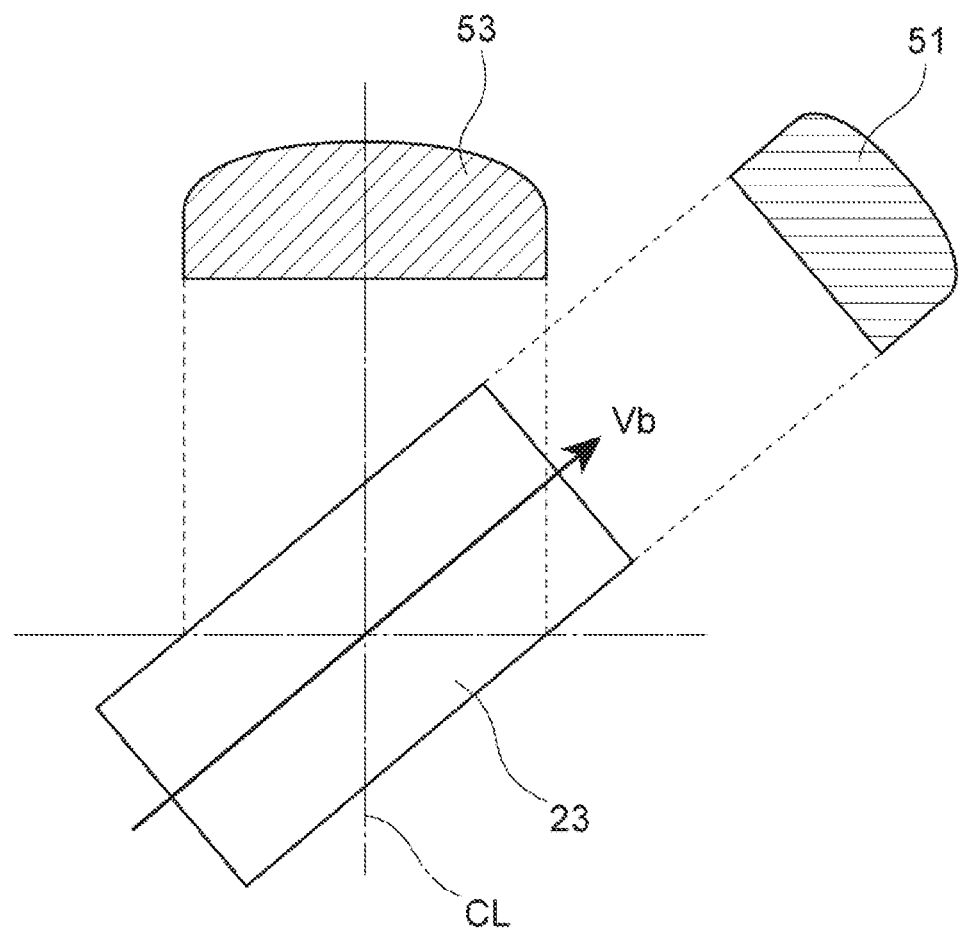
FIG. 9 is an explanatory view showing a plan view of a weld bead formed in a region A1 shown in FIG. 8, and cross-sectional views of the weld bead on line IXA-IXA and on line IXB-IXB.

FIG. 8 is a front view of the lamination-built object 41A, and FIG. 9 is an explanatory view showing a plan view of a weld bead 23 formed in a region A1 shown in FIG. 8, and cross-sectional views of the weld bead 23 on line IXA-IXA and on line IXB-IXB. CL in FIG. 8 and FIG. 9 designates a central axis of the additively-manufactured object 41A.

In the additively-manufactured object 41A configured thus, the continuous formation length of each weld bead can be increased when the direction in which the spiral blade 45 is provided to extend is made to correspond to the continuous formation direction Vb of the weld bead. On that occasion, the bead size of the weld bead is controlled with reference to the shape of a bead section 51 shown in the section on the line IXB-IXB perpendicular to the continuous formation direction of the weld bead in FIG. 9. The bead section 51 shows a section formed at the same timing in weld beads 23. The bead section 51 is a section in a direction where a variation in speed is the minimum with respect to the moving direction of the torch 17 (the moving direction of a welding bar) when the weld beads 23 are formed. Accordingly, the shape of the bead section 51 directly reflects the change of the welding conditions such that a correlation between the welding conditions and the shape of the bead section 51 can be clearly grasped. On the other hand, in the cross-sectional view taken along line IXA-IXA perpendicular to the central axis CL direction shown in FIG. 9, the shape of the bead section 53 corresponds to the shape of the weld beads formed at different timings in times series. Accordingly, the shape of the bead section 53 is hardly controlled by changing the welding conditions. In addition, in such a case that the continuous formation direction Vb of a weld bead is changed, the speed in which the bead is formed actually depends on a place on the bead section 53.

Therefore, the bead size of each weld bead 23 is controlled in association between a change in various welding conditions and a shape of a section perpendicular to the continuous formation direction Vb of the weld bead.

Next, description will be made about the continuous formation direction Vb of weld beads in each weld bead layer when the additively-manufactured object 41A is sliced into a plurality of weld bead layers.

Figure 10:
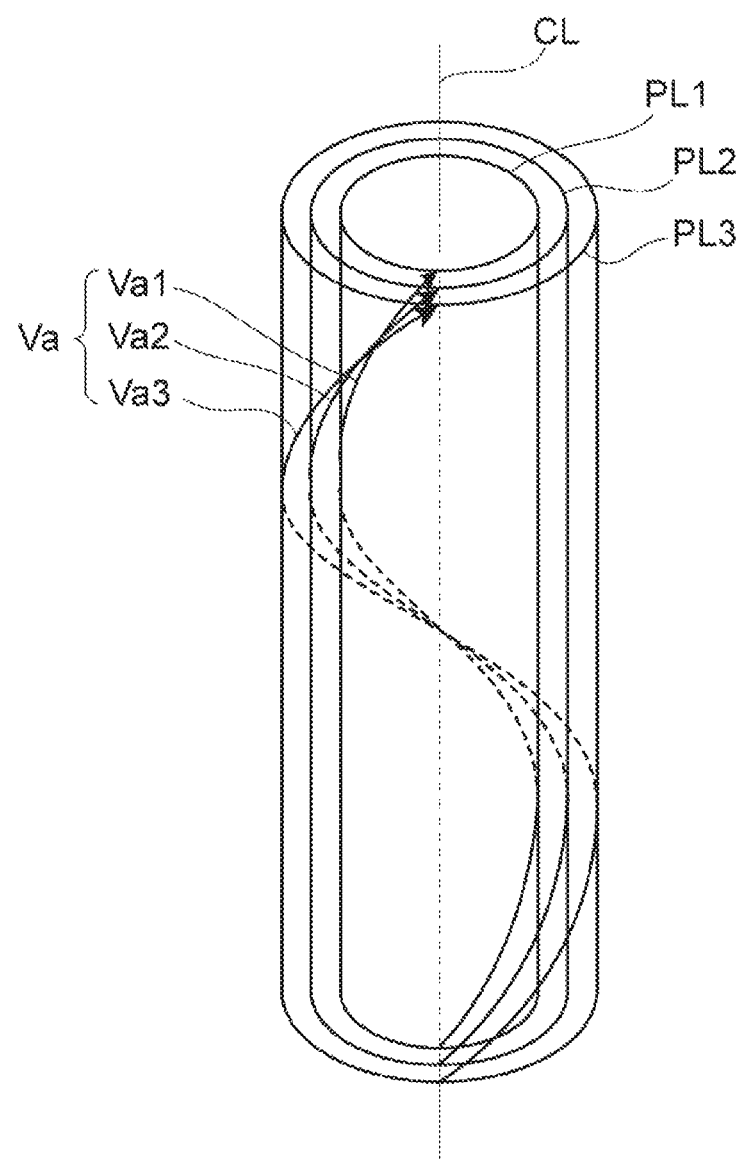
FIG. 10 is a schematic explanatory view for illustrating a method for continuously forming a weld bead in accordance with a shape of the additively-manufactured object.

FIG. 10 is a schematic explanatory view for illustrating the continuous formation method for weld beads depending on the shape of the additively-manufactured object 41A.

The explanatory view shows circumferential faces PL1, PL2 and PL3 at different radial positions (three places in the illustrated example) from the aforementioned central axis CL in the additively-manufactured object 41A, and a direction Va in which one blade 45 is extended.

The circumferential face PL1 is an outer circumference face of the shaft body 43 of the additively-manufactured object 41A shown in FIG. 4, the circumferential face PL3 includes the outermost edge of in the radial direction of blade 45, and the circumferential face PL2 is a circumferential face to be disposed at a radially central position between the circumferential face PL1 and the circumferential face PL3. Here, the circumferential face PL1 corresponds to a layer where weld beads 23 are formed for the first time, and the circumferential face PL3 corresponds to a layer where the weld beads 23 are formed finally, in the additive manufacturing region 49 (see FIG. 7).

Figure 11:
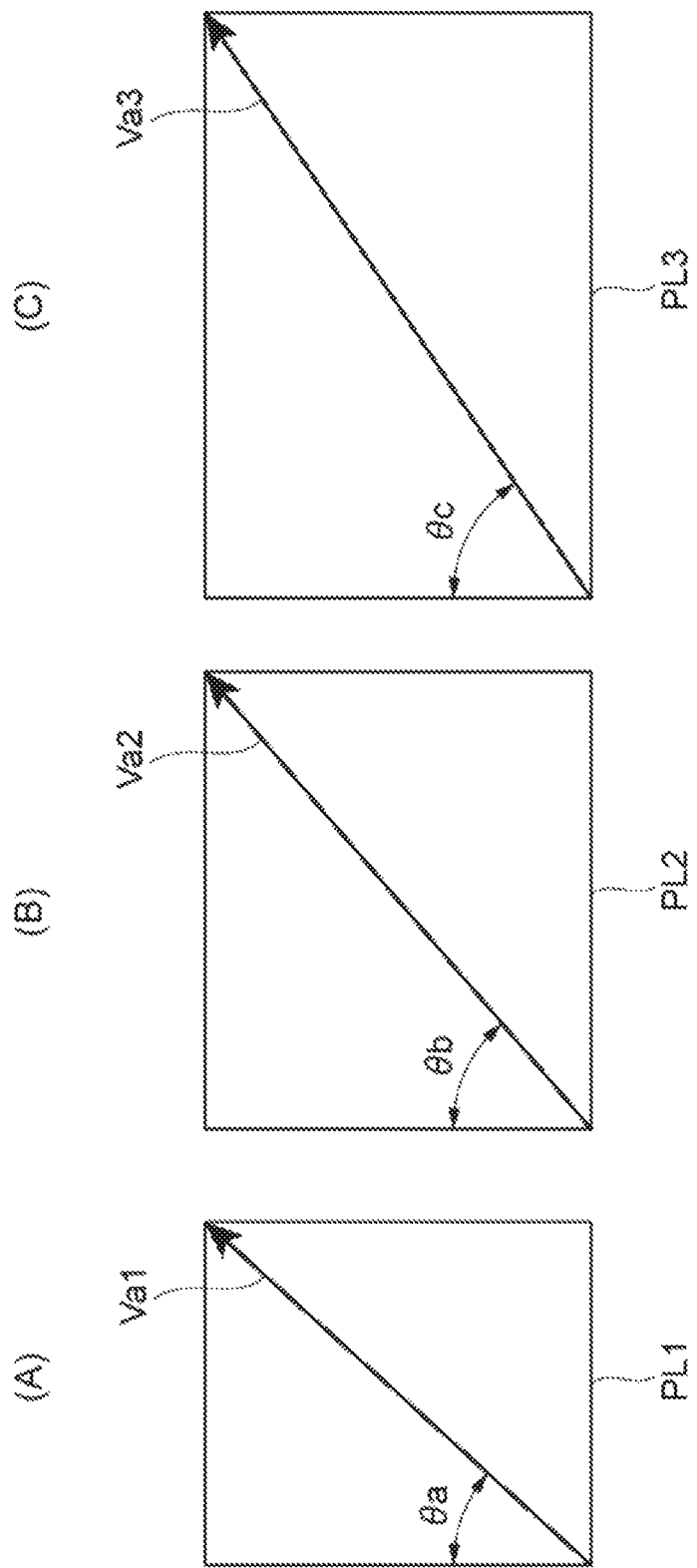
FIG. 11 is a development of circumferential faces of the additively-manufactured object.

When the circumferential faces PL1, PL2 and PL3 are developed on a plane, the circumferential face PL1 is developed as shown in (A) in FIG. 11, the circumferential face PL2 is developed as shown in (B) in FIG. 11, and the circumferential face PL3 is developed as shown in (C) in FIG. 11. In directions Va1, Va2 and Va3 the blade 45 is extended as shown in (A) to (C) of FIG. 11, their inclination angles from the central axis vary to θa, θb and θc (θa<θb<θc) depending on a change in circumferential length due to a difference in radial position.

Figure 12:
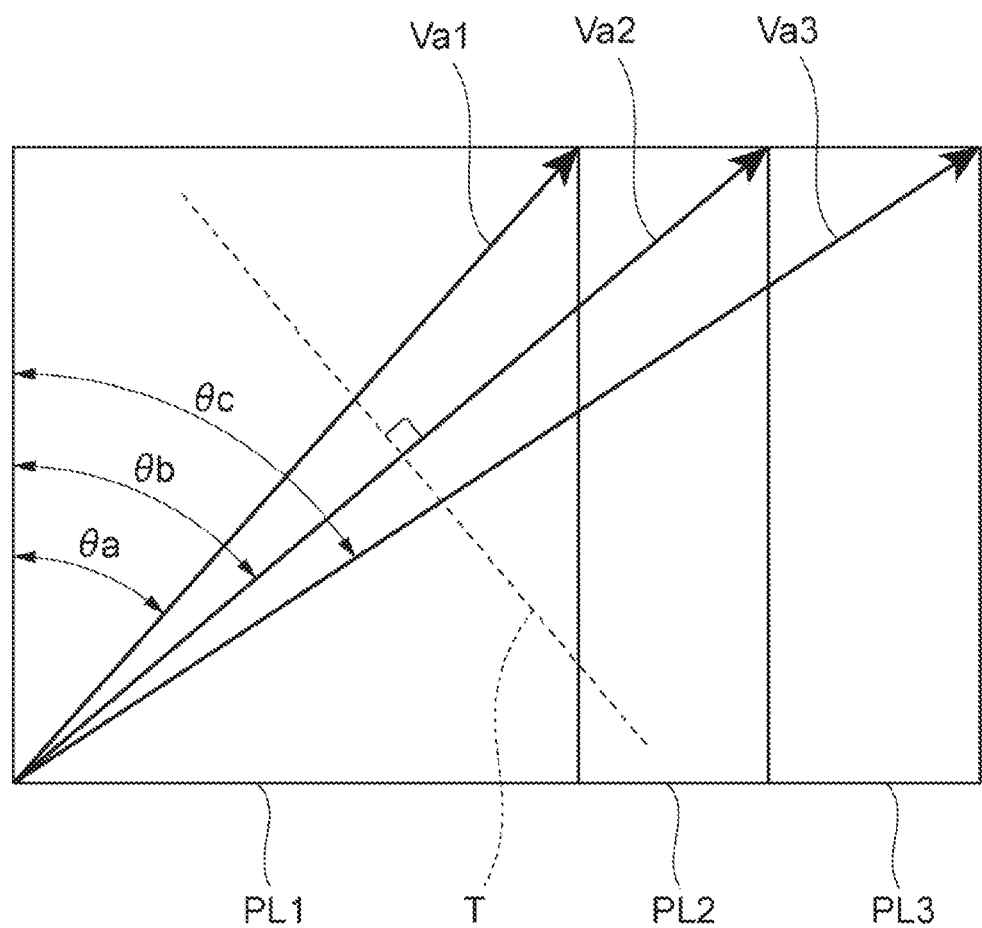
FIG. 12 is an explanatory view in which the circumferential faces shown in (A), (B) and (C) of FIG. 11 are combined on one and the same plane so as to make one-side ends of blades correspond to one another.

FIG. 12 is an explanatory view in which the circumferential faces PL1, PL2 and PL3 shown in (A), (B) and (C) of FIG. 11 are combined on the same plane such that one-side ends of blades (left lower portions in (A), (B) and (C) of FIG. 11) are made to correspond to one another.

As described previously, it is preferable that each weld bead 23 is formed along the direction in which the blade 45 is extended, and the bead size is controlled by the shape of a section perpendicular to the direction in which the blade 45 is extended (the continuous formation direction Vb for the weld bead). However, as shown in FIG. 12, the directions Va1, Va2 and Va3 the blade is extended are not fixed but have the different inclination angles θ, θb and θc depending on the radial position of the additively-manufactured object. Therefore, when the bead size is controlled in a section perpendicular to the continuous formation direction (reference direction) of the weld bead all over the additively-manufactured object, the bead size has to be controlled individually for each position of the weld bead. In that case, it is not possible to control the bead size in common all over the additively-manufactured object, and the amount of computation for the control becomes enormous.

Therefore, a section parallel to a direction T perpendicular to the direction in which (reference direction) Va2 the blade 45 is extended in the circumferential face PL2 located at a radially intermediate position is used as a common control section for controlling the bead size of each weld bead. Thus, the bead size can be controlled to be the common control section at any position of the additively-manufactured object (S13).

After the control section (that is, a section perpendicular to the reference direction) for controlling the bead size of each weld bead is determined as described above, the additive manufacturing region 49 of the additively-manufactured object 41A is sliced into layers each having a height corresponding to one weld bead layer, so as to generate a plurality of virtual bead layers (S14).

Figure 13:
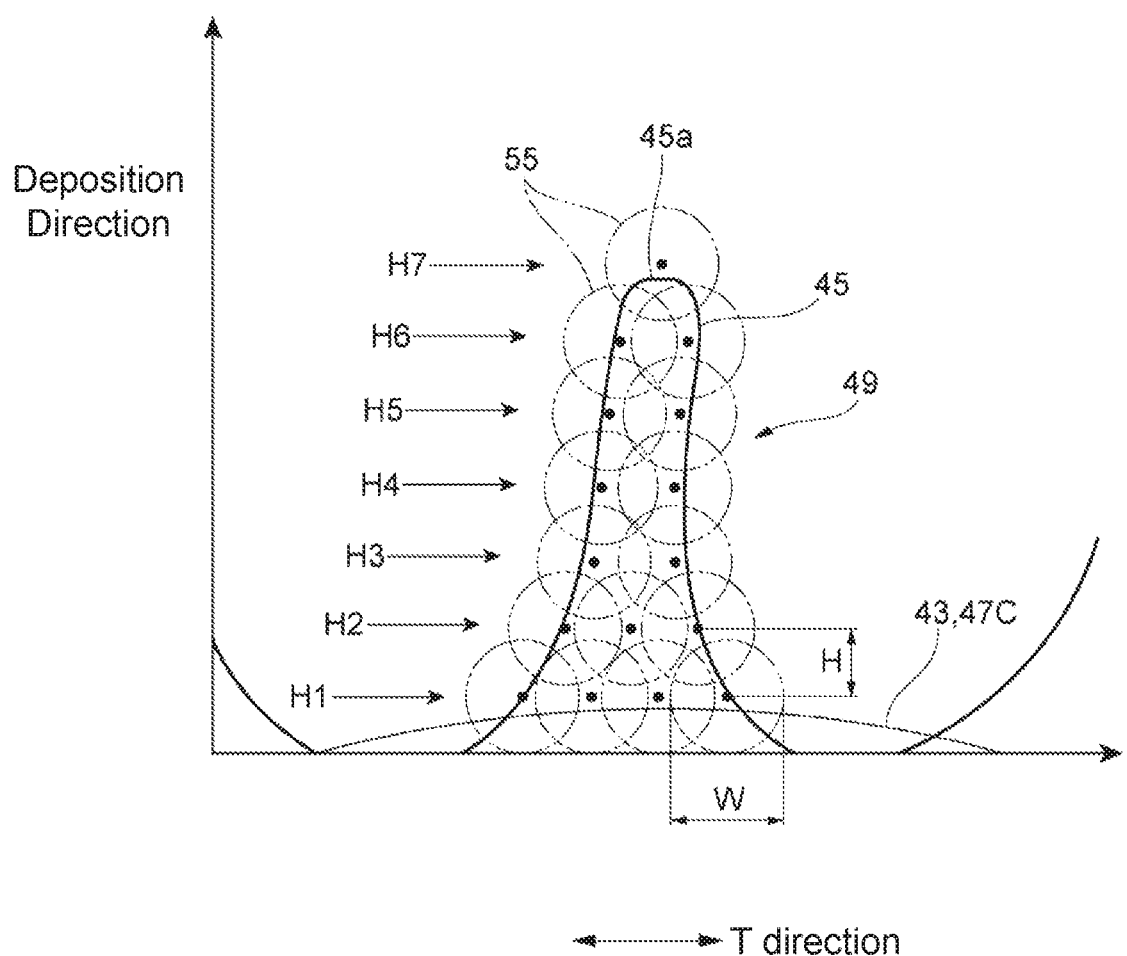
FIG. 13 is an explanatory view showing a state in which one blade serving as a part of the additive manufacturing region of the additively-manufactured object is sliced into layers.

FIG. 13 is an explanatory view showing a state in which one blade 45 serving as a part of the additive manufacturing region 49 of the additively-manufactured object is sliced into layers. The abscissa in FIG. 13 designates the direction T perpendicular to the direction in which (reference direction) the blade 45 is extended.

As for weld beads (illustrated as a virtual bead 55) for forming the blade 45, weld bead layers are deposited n times so as to include the final shape of the blade 45 depending on bead height H corresponding to one weld bead layer. The illustrated example shows a case where the virtual bead 55 shown by the broken line is deposited sequentially (layers H1, H2, . . . ) from the surface of the shaft body 43 (blank 47C), and a radially outermost edge portion 45a of the blade 45 is covered in the seventh layer (layer H7). That is, here is a lamination model including seven virtual bead layers.

In addition, the width of the blade 45 in the reference direction in the illustrated example includes a wider part and a narrower part than the bead width W of one weld bead. The narrow width part of the blade 45 can be built by one weld bead, but there is a fear that the outer shape of the blade cannot be formed perfectly in some place due to contraction between beads in the deposition direction (in the up/down direction in FIG. 13). Therefore, in the layers H1 to H6, a plurality of weld beads (virtual beads 55) are provided side by side in each virtual bead layer. The uppermost layer H7 has a size where the outer shape of the blade can be sufficiently formed by one weld bead. Thus, only one weld bead (virtual bead 55) is disposed.

Here, as for the bead size of each virtual bead 55, the circumferential length is longer in a layer closer to the radial outside in the layers H1 to H7. Therefore, when the moving time of the torch per one round is fixed, the moving speed of the torch is increased in a layer closer to the radial outside and the bead size is reduced. Thus, when each weld bead is formed in each layer H1 to H7, it is preferable that the moving speed is, for example, slowed down in a layer closer to the radial outside, such that the bead size is fixed in all the layers.

In addition, as described above, the position where a bead is disposed is changed in a common control section or the shape of the bead (various parameters such as bead size) is adjusted to increase or decrease, such that the additively-manufactured object can be controlled in common as a whole. Thus, change, adjustment, etc. in design can be made easily. In addition, the shape of each weld bead in each layer has symmetricity with respect to a distance from the center in the deposition direction due to a reference direction set based on a layer at the center in the deposition direction. By use of the symmetricity, design can be also simplified. For example, the shape of each weld bead located at an equal distance from the center in the deposition direction may be standardized. When the number of layers obtained by slicing is an even number, the reference direction may be determined based on an average of the two layers disposed at the center in the deposition direction or based on one of the two layers.

The aforementioned control to increase or decrease bead shapes of weld beads may be, for example, achieved by control to make all the weld beads have the same shape, control to make each weld bead have a shape depending on its position in the deposition direction (radial direction), control to make the bead shapes of the weld beads different depending on the shape of the additive manufacturing region 49, etc.

Such a lamination model is generated for each of the additive manufacturing regions 49 of the additively-manufactured object 41A shown in FIG. 7. In each lamination model, the bead size is designed using a common control section. That is, various conditions such as a layout of beads in each virtual bead layer, a bead size, welding conditions, etc. in each additive manufacturing region 49 are set (S15). FIG. 13 shows an example of division into seven virtual bead layers, but the number of divided layers may be set depending on the bead size of each weld bead, the dimensions and shape of the additively-manufactured object, etc.

Next, a program for making a computer execute a procedure for forming weld beads on a blank in accordance with the lamination model designed as described above is generated (S16).

The program is generated by the program generating unit 25 or 33 shown in FIG. 1, and the generated program is stored in the storage unit 27.

The control unit 29 of the building controller 13 deposits and builds the additively-manufactured object based on a generated program. That is, the control unit 29 reads a desired program from the storage unit 27 and executes the program to drive the building unit 11 (see FIG. 1), thereby building the additively-manufactured object.

Figure 14:
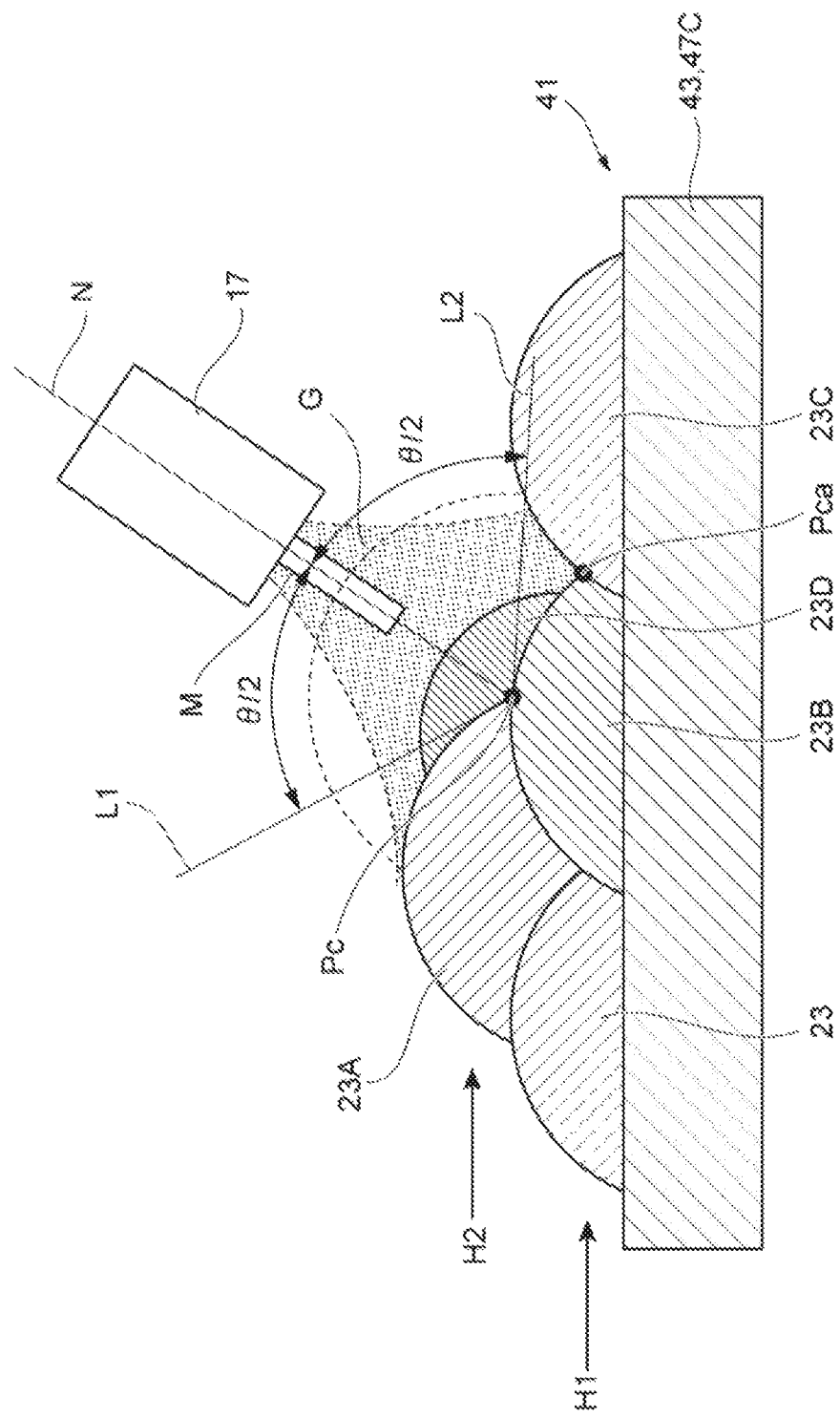
FIG. 14 is a step explanatory view schematically showing a state in which weld beads are formed.

FIG. 14 is a step explanatory view schematically showing a state in which weld beads 23 are formed.

Weld beads 23 (233 and 23C) are placed side by side sequentially to form a weld bead layer of a first layer (layer H1) on the shaft body 43 of the additively-manufactured object 41 in accordance with the program. Then, weld beads 23A and 23D are placed side by side sequentially as a second layer (layer H2) on the weld bead layer of the first layer (layer H1).

Here, it is assumed that a boundary between the outer surface of the weld bead 23A and the outer surface of the weld bead 233 is Pc (a boundary on the illustrated right side of the weld bead 23A), a tangent to the outer surface of the weld bead 23A in the boundary Pc is LL and a tangent to the outer surface of the weld bead 23B in the boundary Pc is L2. In addition, it is assumed that an angle between the tangents L1 and L2 is θ, and a bisector of the angle θ is N.

The next weld bead 23D adjacent to the weld head 23A is formed using the boundary Pc as a target position. When the weld bead 23D is formed, the direction of the torch axis of the torch 17 is set to be substantially the same direction as the straight line N. The target position where the weld bead 23D is to be formed is not limited to the boundary Pc but may be set to be a boundary Pca between the weld bead 23B and the weld bead 23C. That is, any one of boundaries among the three weld beads 23A, 23B and 23C which have been already formed may be set as the target position where a new weld bead 23D is to be formed.

As shown in FIG. 14, the torch 17 is moved to the illustrated deeper side (in a direction perpendicular to the paper) along the program, and the vicinity of the target position is heated by an arc generated in a shielding gas G atmosphere. Then, the filler metal M melted by the heating is solidified at the target position to form a new weld bead 23D.

On this occasion, the weld bead 23D is formed to cover the outer surface of the weld bead 233 and to bridge the outer surface of the weld bead 23A and the outer surface of the weld bead 23C. The bead size of the weld bead 23D is set to be large enough to fill a narrow portion such as the boundary Pc or Pca as described above. Thus, a welding defect such as a blowhole can be prevented from occurring among the weld beads.

As described above, in the method for designing an additively-manufactured object, the shape of the additively-manufactured object is sliced into weld bead layers each having a height corresponding to one bead layer by use of data of a shape of the additively-manufactured object to generate a plurality of virtual bead layers. Further, a direction in which the sliced layer of the additively-manufactured object is continuously extended in intermediate layers disposed at a center between, among the plurality of virtual bead layers, a front layer to be formed for the first time and a rear layer to be formed finally, is set as a reference direction. Then, a bead size of each weld bead to be formed in the plurality of virtual bead layers is adjusted depending on a shape of the bead in a section perpendicular to the reference direction.

In accordance with a lamination model designed thus for the additively-manufactured object, weld beads are formed and deposited with adjusted bead sizes sequentially from the front layer to the rear layer of the plurality of virtual bead layers. Thus, the additively-manufactured object is built.

Unnecessary parts are removed from the additively-manufactured object built thus by cutting, grinding and so on to finish the additively-manufactured object into a final product shape.

As described above, a reference direction for determining a control section for controlling each bead size is not limited to the direction in which a blade is extended in the circumferential face PL2 at the center of the radial direction between the circumferential face PL3 having a largest diameter and the circumferential face PL1 having a smallest diameter in the additive manufacturing region shown in FIG. 10. For example, the reference direction may be set as the direction in which a blade is extended in a virtual bead layer disposed at the center (center in the radial direction) in the deposition direction of divided virtual bead layers when the additive manufacturing region is divided into the layers. Even in this case, the same direction in which the blade is extended is set as the reference direction consequently. That is, the setting of the reference direction may be established in a stage of Step S15 where conditions for forming each layer are set, as shown in FIG. 5. The reference direction may be set in Step S13 or may be set after the division into layers in Step S14.

A layout of weld beads or a design of bead sizes in the additive manufacturing region is not limited to be applied to an additively-manufactured object which is a rotating symmetry body shown in FIG. 4. The designing method or the manufacturing method in the present invention can be suitably applied to an additively-manufactured object as long as it has a shape including at least one protrusion portion continuous along a specific direction. Particularly, an additively-manufactured object having a shape having a twisted structure where the specific direction varies along the deposition direction can be built more efficiently.

In addition, a round bar is used as a blank used for a part of the additively-manufactured object in the aforementioned example, the blank is not limited thereto. For example, a square bar or a sectionally polygonal bar may be used. A member subjected to processing for a stepped portion or another suitable processing, a joined body of a plurality of member, or the like may be used depending on the shape of the additively-manufactured object. Division into a blank region and an additive manufacturing region is set suitably depending on a balance among the man-hours for manufacturing, the manufacturing cost, the material cost, and so on. Therefore, for example, a blank may be selected on the assumption that a portion to be removed by cutting or the like is provided in a part of the blank in consideration of the whole processing until finishing into a product shape.

The present invention is not limited to the embodiments described above, and the combination of configurations of the embodiments with each other or the modification or application by a person skilled in the art based on the statements in the description and common techniques are also expected in the present invention and are included in the claimed range.

As has been described, the present description discloses the following items.

(1) A method for designing an additively-manufactured object to be built by depositing a plurality of weld bead layers formed of a weld bead formed by melting and solidifying a filler metal, the method including:

a slicing step of slicing a shape of the additively-manufactured object into weld bead layers each having a height corresponding to one bead layer using data of the shape of the additively-manufactured object, thereby generating a plurality of virtual bead layers;

a reference direction setting step of setting, as a reference direction, a direction in which the sliced layer of the additively-manufactured object is continuously provided and extended in an intermediate layer disposed at a deposition-direction center of the plurality of virtual bead layers; and a bead adjusting step of adjusting a bead size of the weld bead to be formed in the plurality of virtual bead layers depending on a bead shape in a section perpendicular to the reference direction.

In the method for designing an additively-manufactured object, the bead shape in each virtual bead layer of the additively-manufactured object sliced into the plurality of virtual bead layers is adjusted, using the reference direction in an intermediate layer disposed at the center in the deposition direction, depending on the shape of the bead in a section perpendicular to the reference direction. Therefore, the bead shape of each weld bead in the additively-manufactured object as a whole can be adjusted based on a unified section. Thus, the adjustment of the bead shape is not complicated, but all the virtual bead layers can be adjusted equally. Thus, welding conditions can be set easily.

(2) The method for designing an additively-manufactured object according to (1), in which in the bead adjusting step, the bead shape is adjusted by changing at least one of a continuous formation speed of the weld bead and a heat input to the filler metal.

In the method for designing an additively-manufactured object, the bead size of the weld bead can be controlled with good responsiveness and correctly by changing welding conditions such as a continuous formation speed of the weld bead and the heat input.

(3) The method for designing an additively-manufactured object according to (1) or (2), in which the additively-manufactured object includes at least one protrusion portion that is continuous in the reference direction.

In the method for designing an additively-manufactured object, the weld bead is formed along the direction in which the protrusion portion is continuous. Thus, the take time to build the protrusion portion can be shortened.

(4) The method for designing an additively-manufactured object according to (3), the method including a step of dividing the shape of the additively-manufactured object into a blank region serving as a base body of the additively-manufactured object, and an additive manufacturing region including the protrusion portion to be formed on the base body, in which:

the slicing step is a step of slicing the additively manufacturing region into the plurality of virtual bead layers.

In the method for designing an additively-manufactured object, only the protrusion portion is deposited and built as the additive manufacturing region. Thus, the man-hours for additive manufacturing can be significantly reduced, as compared with a case where all of the object is deposited and built.

(5) The method for designing an additively-manufactured object according to (3) or (4), in which the protrusion portion is a plurality of spiral protrusions extending along one axial direction.

In this method for designing an additively-manufactured object, a shape of a screw, a propeller or the like can be formed by additive manufacturing. Thus, the additively-manufactured object can be processed with a high degree of freedom in shaping, at a low cost and with a high efficiency, as compared with a case where the additively-manufactured object is processed by casting, forging and cutting.

(6) A method for manufacturing an additively-manufactured object built by depositing a plurality of weld bead layers formed of a weld bead formed by melting and solidifying a filler metal, the method including:

a slicing step of slicing a shape of the additively-manufactured object into weld bead layers each having a height corresponding to one bead layer using data of the shape of the additively-manufactured object, thereby generating a plurality of virtual bead layers;

a reference direction setting step of setting, as a reference direction, a direction in which the sliced layer of the additively-manufactured object is continuously provided and extended in an intermediate layer disposed at a deposition-direction center of the plurality of virtual bead layers; and a bead adjusting step of adjusting a bead size of the weld bead to be formed in the plurality of virtual bead layers depending on a bead shape in a section perpendicular to the reference direction; and a building step of forming and depositing the plurality of virtual bead layers sequentially in accordance with the bead size adjusted in the bead adjusting step, thereby building the additively-manufactured object.

In this method for manufacturing an additively-manufactured object, the bead shape in each virtual bead layer of the additively-manufactured object sliced into the plurality of virtual bead layers is adjusted, using the reference direction in an intermediate layer disposed at the center in the deposition direction, depending on the shape of the bead in a section perpendicular to the reference direction. Weld beads are formed and deposited sequentially in accordance with the bead shape adjusted thus. Thus, the additively-manufactured object can be built efficiently with high accuracy.

(7) The method for manufacturing an additively-manufactured object according to (6), including:

a step of dividing the shape of the additively-manufactured object into a blank region serving as a base body of the additively-manufactured object, and an additive manufacturing region including the protrusion portion to be formed on the base body; and a step of selecting a blank depending on the blank region, in which:

the slicing step is a step of slicing the additive manufacturing region into the plurality of virtual bead layers; and the building step is a step of forming the weld bead on the blank.

In the method for manufacturing an additively-manufactured object, only the protrusion portion is deposited and built as the additive manufacturing region. Thus, the man-hours for additive manufacturing can be significantly reduced, as compared with a case where all of the object is deposited and built.

(8) A program for making a computer execute a procedure for designing an additively-manufactured object to be built by depositing a plurality of weld bead layers formed of a weld bead formed by melting and solidifying a filler metal, the program making the computer implement:

a slicing function of slicing a shape of the additively-manufactured object into weld bead layers each having a height corresponding to one bead layer using data of the shape of the additively-manufactured object, thereby generating a plurality of virtual bead layers;

a reference direction setting function of setting, as a reference direction, a direction in which the sliced layer of the additively-manufactured object is continuously provided and extended in an intermediate layer disposed at a deposition-direction center of the plurality of virtual bead layers; and a bead adjusting function of adjusting a bead size of the weld bead to be formed in the plurality of virtual bead layers depending on a bead shape in a section perpendicular to the reference direction.

In the program, the bead shape in each virtual bead layer of the additively-manufactured object sliced into the plurality of virtual bead layers is adjusted, using the reference direction in an intermediate layer disposed at the center in the deposition direction, depending on the shape of the bead in a section perpendicular to the reference direction. Therefore, bead shapes of weld beads for the additively-manufactured object as a whole can be adjusted using the unified reference. The adjustment of the bead shapes is not complicated but all the virtual bead layers are adjusted equally. Thus, the welding conditions can be set easily.

(9) An apparatus for manufacturing an additively-manufactured object to be built by depositing a plurality of weld bead layers formed of a weld bead formed by melting and solidifying a filler metal, the apparatus including a control unit and a building unit, in which the control unit is configured to:

slice a shape of the additively-manufactured object into weld bead layers each having a height corresponding to one bead layer using data of the shape of the additively-manufactured object, thereby generating a plurality of virtual bead layers;

set, as a reference direction, a direction in which the sliced layer of the additively-manufactured object is continuously provided and extended in an intermediate layer disposed at a deposition-direction center of the plurality of virtual bead layers; and adjust a bead size of the weld bead to be formed in the plurality of virtual bead layers depending on a bead shape in a section perpendicular to the reference direction, in which the building unit is configured to be driven by the control unit to form the plurality of virtual bead layers sequentially in accordance with the adjusted bead size.

In the apparatus for manufacturing an additively-manufactured object, the bead shape in each virtual bead layer of the additively-manufactured object sliced into the plurality of virtual bead layers is adjusted, using the reference direction in an intermediate layer disposed at the center in the deposition direction, depending on the shape of the bead in a section perpendicular to the reference direction. Weld beads are formed and deposited sequentially with bead shapes adjusted thus. Thus, the additively-manufactured object can be built efficiently with high accuracy.

(10) The apparatus for manufacturing an additively-manufactured object according to (9), in which the building unit includes:

a torch configured to support the filler metal and melt a tip of the filler metal; and a torch moving mechanism configured to move the torch.

In the apparatus for manufacturing an additively-manufactured object, the weld bead having a desired shape can be formed with a high efficiency while the torch supporting the filler metal is moved by the torch moving mechanism.

(11) The apparatus for manufacturing an additively-manufactured object according to (10), in which the torch moving mechanism is an articulated robot.

In this apparatus for manufacturing an additively-manufactured object, the posture of the torch can be changed desirably such that the additively-manufactured object having a desired shape can be built easily with a high degree of freedom.

The present application is based on Japanese Patent Application No. 2017-229606 filed on Nov. 29, 2017, the contents of which are incorporated herein by reference.

REFERENCE SIGNS LIST 11 building unit
13 building controller
15 power supply unit
17 torch (building unit)
19 welding robot (building unit)
23 weld bead
25, 33 program generating unit
27 storage unit
29 control unit
41, 41A additively-manufactured object
43 shaft body
45 blade
47 blank region
47C blank
49 additive manufacturing region
51 bead section
55 virtual bead
Vb direction in which weld bead is continuously formed
100 apparatus for manufacturing additively-manufactured object

The invention claimed is:

1. A method for designing an additively-manufactured object to be built by depositing a plurality of weld bead layers formed of a weld bead formed by melting and solidifying a filler metal, the method comprising:
a slicing step of slicing a shape of the additively-manufactured object into weld bead layers each having a height corresponding to one bead layer using data of the shape of the additively-manufactured object, thereby generating a plurality of virtual bead layers;
a reference direction setting step of setting, as a reference direction, a direction in which the sliced layer of the additively-manufactured object is continuously provided and extended in an intermediate layer disposed at a deposition-direction center of the plurality of virtual bead layers;
a bead adjusting step of adjusting a bead size of the weld bead to be formed in the plurality of virtual bead layers depending on a bead shape in a section perpendicular to the reference direction, and
a controlling step of controlling a weld bead-depositing device to deposit a plurality of weld bead layers to form the additively-manufactured object,
wherein during the setting of the reference direction, the reference direction is set to reduce the total amount of movement that is spent not depositing weld bead layers of the weld bead-depositing device that deposits the plurality of weld bead layers in order to optimize the efficiency of manufacturing the additively-manufactured object, and
wherein the bead adjusting step is performed by changing at least one selected from the group consisting of formation speed of the weld bead, welding current, welding voltage, and applied pulse based on CAD information about coordinates of the outer surface or dimensional information of the additively-manufactured object.

2. The method for designing an additively-manufactured object according to claim 1, wherein in the bead adjusting step, the bead shape is adjusted by changing at least one of a continuous formation speed of the weld bead and a heat input to the filler metal.

3. The method for designing an additively-manufactured object according to claim 1, wherein the additively-manufactured object includes at least one protrusion portion that is continuous in the reference direction.

4. The method for designing an additively-manufactured object according to claim 3, the method comprising a step of dividing the shape of the additively-manufactured object into a blank region serving as a base body of the additively-manufactured object, and an additive manufacturing region including the protrusion portion to be formed on the base body,
wherein the slicing step is a step of slicing the additively manufacturing region into the plurality of virtual bead layers.

5. The method for designing an additively-manufactured object according to claim 3, wherein the protrusion portion is a plurality of spiral protrusions extending along one axial direction.

6. The method for designing an additively-manufactured object according to claim 4, wherein the protrusion portion is a plurality of spiral protrusions extending along one axial direction.

7. A computer program product comprising a non-transitory computer readable storage medium having instructions encoded thereon that, when executed by a computer, cause the computer to execute a procedure for designing an additively-manufactured object to be built by depositing a plurality of weld bead layers formed of a weld bead formed by melting and solidifying a filler metal, the procedure comprising:
slicing a shape of the additively-manufactured object into weld bead layers each having a height corresponding to one bead layer using data of the shape of the additively-manufactured object, thereby generating a plurality of virtual bead layers;
setting, as a reference direction, a direction in which the sliced layer of the additively-manufactured object is continuously provided and extended in an intermediate layer disposed at a deposition-direction center of the plurality of virtual bead layers;
adjusting a bead size of the weld bead to be formed in the plurality of virtual bead layers depending on a bead shape in a section perpendicular to the reference direction, and
controlling a weld bead-depositing device to deposit a plurality of weld bead layers to form the additively-manufactured object,
wherein during the setting of the reference direction, the reference direction is set to reduce the total amount of movement that is spent not depositing weld bead layers of the weld bead-depositing device that deposits the plurality of weld bead layers in order to optimize the efficiency of manufacturing the additively-manufactured object, and
wherein the bead adjusting step is performed by changing at least one selected from the group consisting of formation speed of the weld bead, welding current, welding voltage, and applied pulse based on CAD information about coordinates of the outer surface or dimensional information of the additively-manufactured object.

8. The method for designing an additively-manufactured object according to claim 2, wherein the additively-manufactured object includes at least one protrusion portion that is continuous in the reference direction.

9. The method for designing an additively-manufactured object according to claim 8, the method comprising a step of dividing the shape of the additively-manufactured object into a blank region serving as a base body of the additively-manufactured object, and an additive manufacturing region including the protrusion portion to be formed on the base body,
   wherein the slicing step is a step of slicing the additively manufacturing region into the plurality of virtual bead layers.

10. The method for designing an additively-manufactured object according to claim 8, wherein the protrusion portion is a plurality of spiral protrusions extending along one axial direction.

11. The method for designing an additively-manufactured object according to claim 9, wherein the protrusion portion is a plurality of spiral protrusions extending along one axial direction.

12. The method for designing an additively-manufactured object according to claim 4, wherein the protrusion portion is attached to the base body.

13. The method for designing an additively-manufactured object according to claim 9, wherein the protrusion portion is attached to the base body.

* * * * *